US009875353B2

(12) United States Patent
Uehara et al.

(10) Patent No.: US 9,875,353 B2
(45) Date of Patent: Jan. 23, 2018

(54) LOG INFORMATION GENERATION APPARATUS AND RECORDING MEDIUM, AND LOG INFORMATION EXTRACTION APPARATUS AND RECORDING MEDIUM

(71) Applicant: Soliton Systems, K.K., Tokyo (JP)

(72) Inventors: Kazuhiro Uehara, Tokyo (JP); Kaori Araki, Tokyo (JP); Kazuo Nishikawa, Tokyo (JP)

(73) Assignee: SOLITON SYSTEMS K.K., Tokyo (JP)

( * ) Notice: Subject to any disclaimer, the term of this patent is extended or adjusted under 35 U.S.C. 154(b) by 0 days.

(21) Appl. No.: 15/224,382

(22) Filed: Jul. 29, 2016

(65) Prior Publication Data

US 2017/0103200 A1 Apr. 13, 2017

Related U.S. Application Data

(63) Continuation of application No. PCT/JP2016/063488, filed on Apr. 28, 2016.

(30) Foreign Application Priority Data

Oct. 7, 2015 (JP) .................................. 2015-199588

(51) Int. Cl.
*G06F 21/00* (2013.01)
*G06F 21/52* (2013.01)
*G06F 21/56* (2013.01)

(52) U.S. Cl.
CPC ............ *G06F 21/52* (2013.01); *G06F 21/566* (2013.01)

(58) Field of Classification Search
CPC ........... G06F 11/3409; G06F 17/30017; G06F 17/30554; G06F 11/0706
See application file for complete search history.

(56) References Cited

U.S. PATENT DOCUMENTS

| 2013/0298192 A1* | 11/2013 | Kumar | .................... G06F 21/52 |
| | | | 726/3 |
| 2015/0180894 A1* | 6/2015 | Sadovsky | ............. G06F 3/0481 |
| | | | 726/22 |
| 2015/0341389 A1* | 11/2015 | Kurakami | ............... H04L 63/20 |
| | | | 726/1 |

FOREIGN PATENT DOCUMENTS

| JP | 2003-233521 A | 8/2003 |
| JP | 2005-527008 A | 9/2005 |
| JP | 2010-146457 A | 7/2010 |

* cited by examiner

*Primary Examiner* — Ghazal Shehni
(74) *Attorney, Agent, or Firm* — Alston & Bird LLP

(57) ABSTRACT

A log information generation apparatus includes: a process information generation unit which generates first identification information for temporally and spatially uniquely identifying a process that is an execution subject of an application program at a start of a process behavior constituted by a series of events of the process, in a space of a system including a plurality of computers, and which generates process information including the first identification information; an event information generation unit which generates event type information indicating an event type for each of the events and which generates event information including the event type information; and a log information generation unit which generates, for each of the events, log information including the process information generated by the process information generation unit and the event information generated by the event information generation unit.

11 Claims, 15 Drawing Sheets

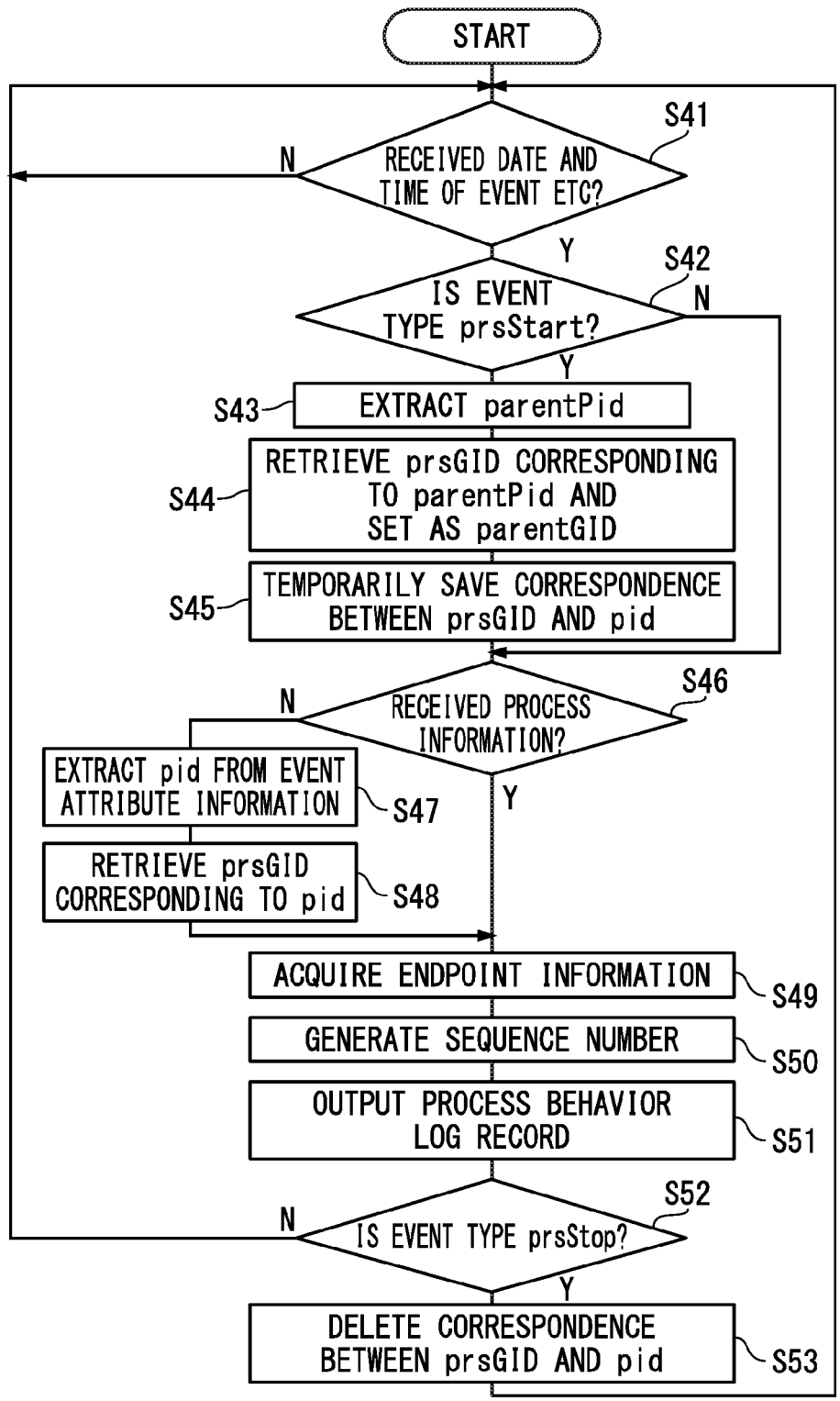

FIG. 9

| SEQU-ENCE NUMBER | DATE AND TIME OF EVENT | ENDPOINT INFORMATION | PROCESS INFORMATION | | EVENT INFORMATION | |
|---|---|---|---|---|---|---|
| | | | prs-GID | PROCESS ATTRIBUTE INFORMATION | EVENT TYPE | EVENT ATTRIBUTE INFORMATION |
| 101 | t10 | user="User1"... | "gid1" | name="C:¥...¥Temp¥ReadMe.txt.exe" hash="hsh10" parentGID="..." pid="pid1" parentPid="..." productName="..." | prs-Start | |
| 102 | t11 | user="User1"... | "gid1" | | tcp-Open | tcpGID="gid11" dstIP="54...184" ... |
| 103 | t12 | user="User1"... | "gid1" | | file-Create | file="C:¥...¥Temp¥ReadMe.txt" pid="pid1" ... |
| 104 | t13 | user="User1"... | "gid1" | | file-Close | wByte="5502" file="C:¥...¥Temp¥ReadMe.txt" hash="hsh001" pid="pid1" ... |
| 105 | t14 | user="User1"... | "gid1" | | tcp-Close | tcpGID="gid11" ... |
| 106 | t40 | user="User1"... | "gid2" | name="C:¥Windows¥...¥NOTEPAD.EXE" hash="..." parentGID="gid1" pid="pid3" parentPid="pid1" productName="Notepad" | prs-Start | |
| 107 | t41 | user="User1"... | "gid2" | | file-Open | file="C:¥...¥Temp¥ReadMe.txt" hash="hsh001" pid="pid3" ... |
| 108 | t15 | user="User1"... | "gid1" | | tcp-Open | tcpGID="gid12" dstIP="54...184" ... |
| 109 | t16 | user="User1"... | "gid1" | | file-Create | file="C:¥Program Files¥trHorse.exe" pid="pid1" ... |
| 110 | t17 | user="User1"... | "gid1" | | file-Close | wByte="31232" file="C:¥Program Files¥trHorse.exe" hash="hsh11" pid="pid1" ... |
| 111 | t18 | user="User1"... | "gid1" | | tcp-Close | tcpGID="gid12" ... |
| 112 | t19 | user="User1"... | "gid1" | | reg-ValSet | key="...¥SOFTWARE¥...¥Run" entry="trHorse.exe" ... |
| 113 | t20 | user="User1"... | "gid1" | | file-Create | file="...¥User1¥...¥Startup¥trHorse.exe.lnk" pid="pid1" ... |
| 114 | t21 | user="User1"... | "gid1" | | file-Close | wByte="182" file="C:¥...¥User1¥...¥Startup¥trHorse.exe.lnk" hash="..." pid="p_idl" ... |
| 115 | t22 | user="User1"... | "gid1" | | file-Delete | file="C:¥...¥Temp¥ReadMe.txt.exe" pid="pid1" ... |
| 116 | t23 | user="User1"... | "gid1" | | prs-Stop | |
| ... | ... | ... | ... | | | |
| 217 | t42 | user="User1"... | "gid2" | | file-Close | rByte="5502" file="C:¥...¥Temp¥ReadMe.txt" hash="hsh001" pid="pid3" |
| 218 | t43 | user="User1"... | "gid2" | | prs-Stop | |

FIG. 11

| SEQU-ENCE NUMBER | DATE AND TIME OF EVENT | ENDPOINT INFORMATION | PROCESS INFORMATION | | EVENT INFORMATION | |
|---|---|---|---|---|---|---|
| | | | prs-GID | PROCESS ATTRIBUTE INFORMATION | EVENT TYPE | EVENT ATTRIBUTE INFORMATION |
| ... | ... | ... | ... | ... | ... | ... |
| 419 | $t_{60}$ | user="User1"... | | | logon | tcpGID="gid010" user="User1"... |
| ... | ... | ... | ... | ... | ... | ... |
| 520 | $t_{70}$ | user="User1"... | "gid3" | name="C:¥Windows¥Explorer.EXE" hash="" parentGID="" pid="pid0" parentPid="" productName="Explorer" | prs-Start | |
| 621 | $t_{80}$ | user="User1"... | "gid4" | name="C:¥Windows¥...¥Temp¥trHorse.exe" hash="hsh11" parentGID="gid3" pid="pid1" parentPid="pid0" productName="" ... | prs-Start | |
| 622 | $t_{81}$ | user="User1"... | "gid4" | | tcp-Open | tcpGID="gid101" dstIP="55...201"... |
| 623 | $t_{82}$ | user="User1"... | "gid4" | | tcp-Open | tcpGID="gid102" dstIP="55...202"... |
| 624 | $t_{83}$ | user="User1"... | "gid4" | | file-Open | file="C:¥...¥User1¥Documents¥FinancialInfo.docx" hash="..." pid="pid1"... |
| 625 | $t_{84}$ | user="User1"... | "gid4" | | file-Close | rByte="36846" file="C:¥...¥User1¥Documents¥FinancialInfo.docx" hash="" pid="pid1"... |
| 626 | $t_{85}$ | user="User1"... | "gid4" | | tcp-Close | tcpGID="gid102"... |
| 627 | $t_{86}$ | user="User1"... | "gid4" | | tcp-Open | tcpGID="gid103" dstIP="55...202"... |
| 628 | $t_{87}$ | user="User1"... | "gid4" | | file-Open | file="C:¥...¥User1¥Documents¥CustomersList.xlsx" hash="..." pid="pid1"... |
| 629 | $t_{88}$ | user="User1"... | "gid4" | | file-Close | rByte="15328" file="C:¥...¥User1¥Documents¥CustomersList.xlsx" hash="" pid="pid1"... |
| 630 | $t_{89}$ | user="User1"... | "gid4" | | tcp-Close | tcpGID="gid103"... |
| 631 | $t_{90}$ | user="User1"... | "gid4" | | tcp-Close | tcpGID="gid101"... |
| 632 | $t_{91}$ | user="User1"... | "gid4" | | prs-Stop | |
| ... | ... | ... | ... | ... | ... | ... |

LOG INFORMATION GENERATION APPARATUS AND RECORDING MEDIUM, AND LOG INFORMATION EXTRACTION APPARATUS AND RECORDING MEDIUM

CROSS REFERENCE TO RELATED APPLICATIONS

This application is a continuation of International Patent Application No. PCT/JP2016/063488, filed Apr. 28, 2016, which claims the benefit of Japanese Patent Application No. 2015-199588, filed Oct. 7, 2015, each of which is incorporated by reference herein.

FIELD

The present invention relates to a log information generation apparatus and a recording medium, and to a log information extraction apparatus and a recording medium.

BACKGROUND

In cyber-attacks, where malicious program code is executed on various information processing apparatuses such as a computer, and as a result personal information and confidential information are leaked, has become a significant challenge. An application program including such malicious program code is referred to as "malware." Cyber-attacks are becoming increasingly sophisticated, and because malware may carry out their attacks using unknown methods in addition to known methods, a perfect defense method against malware has not yet been developed.

Japanese Patent Application Laid-open No. 2013-222422 discloses a technique for analyzing a likelihood of an application program being malware based on using permission information of respective functions described in a manifest file that is used to provide information related to the application program to an operating system (OS) (refer to PTL 1).

Japanese Patent Application Laid-open No. 2010-182194 discloses recording an entering and leaving log, a PC operation log, and an MFP (multifunction peripheral) operation log, and generating an integrated log in which the log data are associated with each other (refer to PTL 2).

CITATION LIST

Patent Literature

[PTL 1]
Japanese Patent Application Laid-open No. 2013-222422
[PTL 2]
Japanese Patent Application Laid-open No. 2010-182194

The present invention solves problems existing in conventional art.

BRIEF SUMMARY

A log information generation apparatus according to some embodiments of the present invention includes: a process information generation unit which generates first identification information for temporally and spatially uniquely identifying a process that is an execution subject of an application program at a start of a process behavior constituted by a series of events of the process, in a space of a system including a plurality of computers, and which generates process information including the first identification information;

an event information generation unit which generates event type information indicating an event type for each of the events, and which generates event information including the event type information; and a log information generation unit which generates, for each of the events, log information including the process information generated by the process information generation unit and the event information generated by the event information generation unit.

A log information extraction apparatus according to some embodiments of the present invention includes: an input unit to which time information and execution environment information are input in a space of a system including a plurality of computers; a log information storage unit which stores log information having time information, execution environment information, process information which is generated at a start of a process behavior constituted by a series of events of a process that is an execution subject of an application program and which includes first identification information for temporally and spatially uniquely identifying the process, and event information that includes event type information indicating an event type, wherein the log information has these pieces of information for each of the events; and a log information extraction unit which detects first identification information included in log information corresponding to the time information and the execution environment information input to the input unit among all the log information pieces stored in the log information storage unit, and which extracts all or a part of log information including the detected first identification information.

Advantageous Effects of Invention

Some embodiments of the present invention enables log information for readily identifying a process started at an arbitrary time and in an arbitrary execution environment to be extracted in an efficient manner.

BRIEF DESCRIPTION OF THE DRAWINGS

FIG. 8 is a flow chart showing a behavior routine of a log information generation unit in step S7 and step S10.

FIG. 9 is a diagram showing a process behavior log representing an execution state of malware (a dropper).

FIG. 11 is a diagram showing a process behavior log representing an execution state of malware (a RAT).

DETAILED DESCRIPTION

Figure 1:
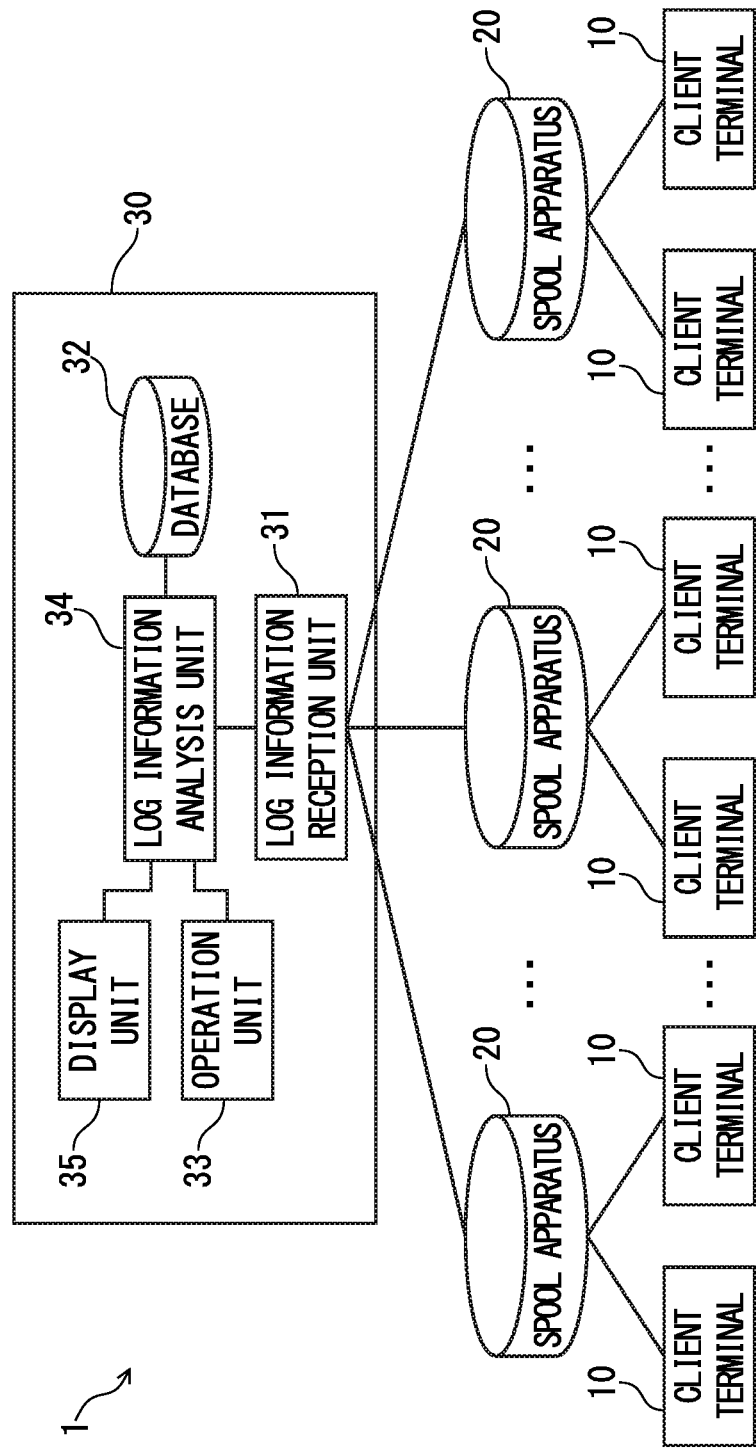
FIG. 1 is a diagram showing a schematic configuration of an entire malware detection system.

Hereinafter, embodiments of the present invention will be described in detail with reference to the drawings. FIG. 1 is a diagram showing a schematic configuration of an entire malware detection system 1.

The malware detection system 1 includes a plurality of client terminals 10 which are directly operated by respective users, a plurality of spool apparatuses 20 which temporarily save log information transmitted from the client terminals 10, and a log information extraction apparatus 30 which analyses log information transmitted from the spool apparatuses 20 and extracts log information for detecting malware.

Each time a process as an execution subject of an application program is executed, the client terminal 10 generates a process behavior log which is a log indicating behavior of the process. In addition, the client terminal 10 generates an operation log with respect to operations independent of the process such as a user logon. All logs generated by the client terminal 10 including a process behavior log and an operation log will be referred to as log information. Then, the client terminal 10 transmits the log information to a prescribed spool apparatus 20 either periodically or when a data size of the log information reaches a prescribed value.

Figure 2:
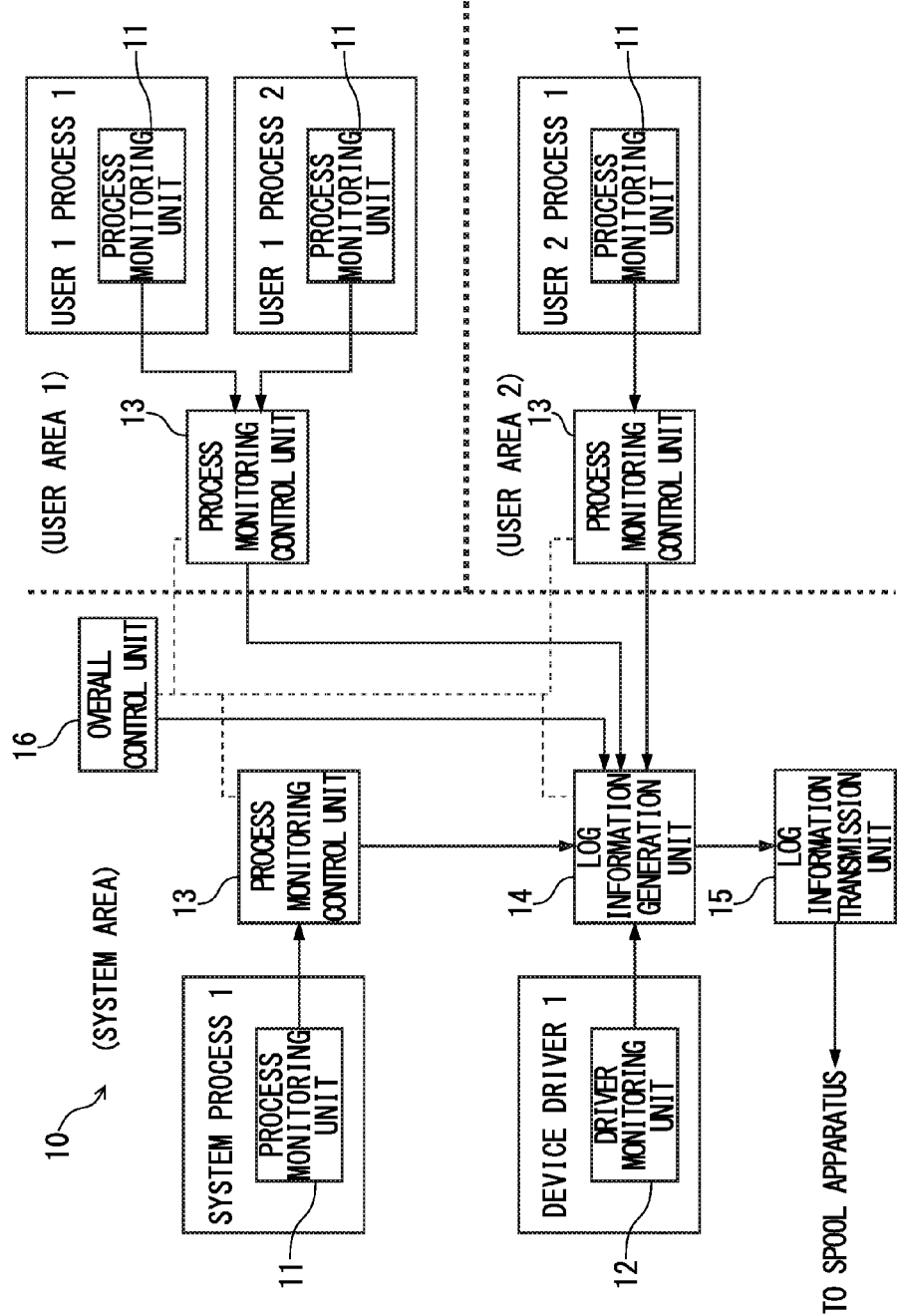
FIG. 2 is a block diagram showing a functional configuration of a client terminal.

FIG. 2 is a block diagram showing a functional configuration of the client terminal 10. The client terminal 10 is realized by, for example, installing a program recorded on a recording medium or a program transmitted from the outside to a computer. The client terminal 10 can be divided into a system area which is a memory space allocated to enable the system to operate and one or more user areas which are memory spaces that can be used by the respective users to operate their own application programs. One client terminal 10 has only one system area but the number of user areas included therein corresponds to the number of users who are logged on.

The client terminal 10 includes a process monitoring unit 11 which monitors behavior of a process being executed on the client terminal 10, a driver monitoring unit 12 which monitors behavior of a device driver, and a process monitoring control unit 13 which controls the process monitoring unit 11 and uses output information thereof.

Moreover, a device driver refers to a program used by an OS installed on the client terminal 10 to control a peripheral apparatus (a device) connected to the client terminal 10. For example, when a device driver is a file input and output driver, the device driver performs behavior (events) related to file operations (to be described later) including generating a new file, opening an existing file, and deleting an existing file.

Accordingly, when a process performs behavior related to a file operation or the like, first, the process requests the OS to perform desired processing and, next, the OS performs the processing by controlling a prescribed device driver. Therefore, a device driver performs processing desired by a process requesting the desired processing without directly knowing the process itself.

Furthermore, the client terminal 10 includes a log information generation unit 14 which generates log information based on receiving monitoring results of the process monitoring unit 11 and the driver monitoring unit 12, and operation log-related information independent of the process from an overall control unit 16 (to be described later); a log information transmission unit 15 which transmits the log information to a spool apparatus 20 either periodically or when a data size of the log information reaches a prescribed value; and the overall control unit 16 which performs overall control related to the monitoring of process behavior, the monitoring of device driver behavior, and the generation of log information in the client terminal 10. In addition, the overall control unit 16 generates information related to an operation log attributable to operations independent of a process such as a user logon.

The process monitoring unit 11 is provided with respect to all processes to be monitored in the system area and the user areas. One process monitoring control unit 13 is provided in the system area and one process monitoring control unit 13 is provided in each user area.

The spool apparatus 20 shown in FIG. 1 behaves as a relay server for transmitting log information output from the client terminal 10 to the log information extraction apparatus 30. The spool apparatus 20 receives and temporarily accumulates log information transmitted from one or more client terminals 10 and collectively transmits the accumulated log information to the log information extraction apparatus 30 at a prescribed timing.

The log information extraction apparatus 30 is realized by, for example, installing a program recorded on a recording medium or a program transmitted from the outside to a computer. The log information extraction apparatus 30 collects log information from all client terminals 10 via the spool apparatuses 20. When an operator confirms an occurrence of a cyber-attack alert which warns of a suspected occurrence of a security incident such as a malware infection, the operator outputs information on the cyber-attack alert (date and time of event, endpoint information, and the like) to the log information extraction apparatus 30 via an operator terminal (not shown). When information on a cyber-attack alert is inputted, the log information extraction apparatus 30 extracts log information necessary for detecting malware.

Alternatively, the log information extraction apparatus 30 can receive information on a cyber-attack alert (date and time of event, endpoint information, and the like) and automatically extract log information necessary for detecting malware based on the received date and time of event, endpoint information, and the like.

Specifically, the log information extraction apparatus 30 includes a log information reception unit 31 which receives a process behavior log from the spool apparatus 20, a database 32 which is a storage medium for storing received log information, an operation unit 33 which outputs information in accordance with an operation input by the operator, a log information analysis unit 34 which analyzes and extracts log information necessary for detecting malware, and a display unit 35 which displays an analysis result of log information and also displays other information.

In addition to log information transmitted from each client terminal 10 in the malware detection system 1, the database 32 stores other information necessary for analyzing log information such as various attributes related to known malware.

Figure 3:
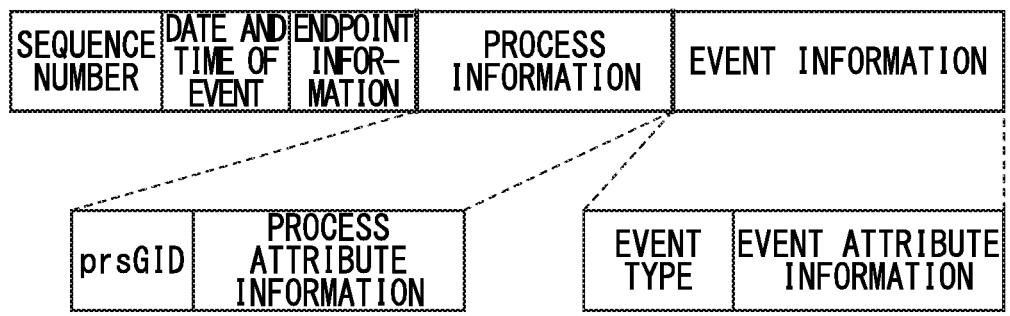
FIG. 3 is a diagram showing a structure of a process behavior log record.

FIG. 3 is a diagram showing a structure of a process behavior log record. A process behavior log is constituted by one or more process behavior log records. A process behavior log record is constituted by a "sequence number" which indicates an order of occurrence of a process behavior having caused the process behavior log record to be generated, a "date and time of event" which indicates a date and time of occurrence of the process behavior, "endpoint information" which indicates an execution environment of the process behavior, "process information" for describing the process, and "event information" which indicates what was executed by the process as its behavior.

Process information is constituted by a "process GID (prsGID)" which uniquely identifies a process having operated at an arbitrary time and in an arbitrary execution environment and "process attribute information" which describes various attributes related to the process. In addition, event information is constituted by an "event type" which represents a type of behavior executed by the process and "event attribute information" which describes various attributes related to the process behavior represented by the event type.

The sequence number is generated by the log information generation unit 14. The date and time of event is generated by the process monitoring unit 11 or the driver monitoring unit 12. The endpoint information is generated by the log information generation unit 14. The process information is generated by the process monitoring control unit 13. The event information is generated by the process monitoring unit 11 or the driver monitoring unit 12.

Moreover, in the present embodiment, the log information generation unit 14 receives components of process behavior logs from a plurality of the process monitoring control units 13 and collectively generates sequence numbers therefor. However, generation of sequence numbers is not limited to this example.

For example, when an order of generation of process behavior logs with respect to a given process must be strictly guaranteed, the process monitoring unit 11 can generate a tentative sequence number indicating an order of a process behavior of the process together with a date and time of event. In this case, the log information generation unit 14 receives the date and time of event and the tentative sequence number from a plurality of the process monitoring units 11 through the process monitoring control unit 13, sorts the tentative sequence numbers based on the date and time of event, and newly generates sequence numbers with respect to all the log information of the client terminal 10.

Meanwhile, an operation log independent of a process is structured such that process information is omitted from the process behavior log record shown in FIG. 3. Event information in an operation log is generated by the overall control unit 16.

Figure 4:
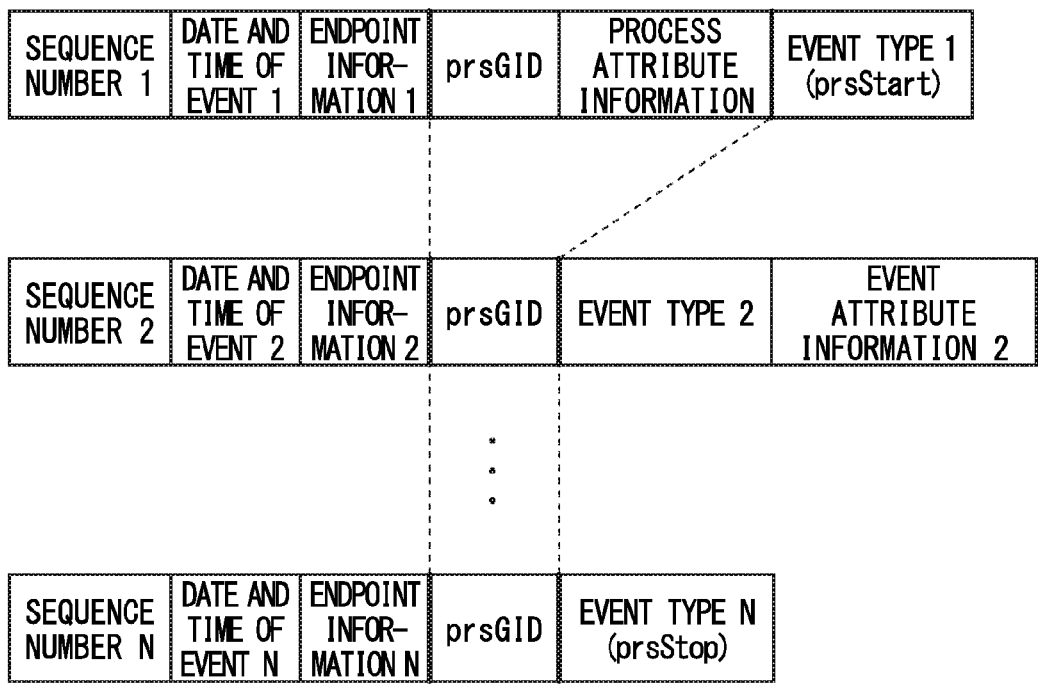
FIG. 4 is a diagram showing a configuration of a process behavior log related to a series of behaviors from process start to process end of a process.

FIG. 4 is a diagram showing a configuration of a process behavior log related to a series of behaviors from a process start to a process end of a process having operated at a given time and in a given execution environment. When a given process is started, as shown in an upper section of FIG. 4, a process behavior log record is generated which is constituted by a sequence number 1, a date and time of event 1, endpoint information 1, a prsGID which globally (temporally and spatially) uniquely identifies the process, process attribute information related to the process, and prsStart that is an event type representing a start of the process. In this case, since all information corresponding to event attribute information related to process start is collectively described in process attribute information, event attribute information is omitted.

When the process performs a next behavior, as shown in a middle section of FIG. 4, a process behavior log record is generated which is constituted by a sequence number 2, a date and time of event 2, endpoint information 2, the same prsGID as used upon process start, an event 2 which is an event type representing the behavior, and event attribute information 2 describing various attributes related to the behavior. In other words, in this process behavior log record, process attribute information is omitted.

When the process ends, as shown in a lower section of FIG. 4, a process behavior log record is generated which is constituted by a sequence number N, a date and time of event N, endpoint information N, the same prsGID as used upon process start, and prsStop which is an event type representing an end of the process. In other words, process attribute information is also omitted in this process behavior log record. In addition, in the present example, since event attribute information related to the end of the process does not exist, event attribute information is also omitted.

As described above, while process attribute information is included in the process behavior log record upon the start of a process, process attribute information is omitted from process behavior log records subsequent to the start of the process. This is because process attribute information is information having one-to-one correspondence with a prsGID and is a set of parameters being constant from the start to the end of the process and, therefore, suffices to exist only at the start of the process.

However, a prsGID is usually represented by an unintelligible character string. In consideration thereof, in order to readily understand what process is indicated by a given prsGID, a name of a process execution file for the process which is represented in readable text may be added to the prsGID.

An example of a format of a date and time of event is as follows.

"MM/DD/YYYY hh:mm:ss.sss±hhmm"

Each parameter in this format is as follows.

MM: month
DD: day
YYYY: year
hh: hour
mm: minute
ss.sss: second (in order of msec)
hhmm: time difference from Coordinated Universal Time (where hh denotes hour and mm denotes minute)

Accordingly, for example, with respect to a process behavior having occurred at 18.033 seconds at 20:52 on Jul. 15, 2015, Japan Standard Time (JST), a description example of the date and time of event is as follows.

"07/15/2015 20:52:18.033+0900"

A sequence number is a parameter independent of a date and time of event. For example, even for events on the same date and time, sequence numbers are never the same. Accordingly, using a sequence number, an order of occurrence of a process behavior can be indicated in a msec order or shorter. In addition, even when a change in time settings of the OS occurs, a sequence number can indicate an absolute order of occurrence of a process behavior without being affected by the change in time settings.

Endpoint information corresponds to "user: (logon) user name," for example. Alternatively, endpoint information also corresponds to a computer name, a computer domain name, a terminal management ID, a host IP address, a MAC address, or the like.

Endpoint information is a set of parameters independent of a process. Generally, endpoint information does not significantly change for each process behavior log record. However, when dynamically changing an IP address of a host using DHCP (Dynamic Host Configuration Protocol) or the like, for example, endpoint information may possibly change independent of a behavior of a process. Accordingly, endpoint information is assigned to all process behavior log records.

A prsGID (a process GID) is an identifier uniquely allocated to a process having been generated and operated at an arbitrary time and in an arbitrary execution environment. For example, a GUID (Globally Unique Identifier) used in Windows® by Microsoft or a UUID (Universally Unique Identifier) as set forth in ISO/IEC 11578 corresponds to a prsGID. A prsGID is represented as, for example, "F6C32025-DC83-4126-A1B7-7D6E6FCBB10C,"

Process attribute information describes various attributes related to a process that is an execution subject of an arbitrary behavior. An example of process attribute information is as follows.

name: a name of a process execution file (full path)
    hash: a hash value of a process execution file
    parentGID: a prsGID for a parent process having started a present process
    pid: a unique in-system (in-execution environment) identifier assigned to the present process by the system
    parentPid: a pid of the parent process having started the present process
    product Name: a product name of a software product to which the process belongs.

In addition to the above, examples of process attribute information include a name of a process execution file of the parent process, a version number of the process, a file size of the process execution file, a name of a copyright holder of the process execution file, a manufacturer of the software product, a product description, certificate-related information, and the like.

Examples of an event type and event attribute information thereof are as follows.

1. Process-Related Event Types
(1) prsStart (Start of Process)
    prsStart does not have event attribute information.
(2) prsStop (End of Process)
    prsStop does not have event attribute information.
(3) Others
Other examples of process-related event types include prsRun which indicates that a process identified by a prsGID is running at, for example, 00:00 of a day.

2. Network-Related Event Types
(1) tcpOpen (Start of a TCP (Transmission Control Protocol) Network Connection)
Examples of event attribute information of tcpOpen are as follows.
    dstIP: an IP address of a connection destination
    tcpGID: an identifier uniquely allocated to a network connection having been started at an arbitrary time and in an arbitrary execution environment
Other examples of event attribute information of tcpOpen include a host name of the connection destination, a port number and the like.
(2) tcpClose (End of TCP Network Connection)
Examples of event attribute information of tcpClose are as follows.
    tcpGID: a tcpGID assigned by corresponding tcpOpen
Other examples of event attribute information of tcpClose include a date and time of start of connection destination.
(3) Others
Other network-related event types include tcpRun which indicates that a TCP network connection of a process identified by at least one of a prsGID and a tcpGID continues at, for example, 00:00 of a day, tcpListen which indicates that the process has entered a standby state for a TCP network connection, tcpSend which indicates that data transmission has been performed in the TCP network connection, and tcpReceive which indicates that data reception has been performed in the TCP network connection. Furthermore, there are similar event types or the like related to UDP (User Datagram Protocol).

3. Event Types Related to File Operations
(1) fileCreate (Generation of a New File)
Examples of event attribute information of fileCreate are as follows.
    file: a name of the generated file
    pid: a pid of a process requesting the generation
Other examples of event attribute information of fileCreate include a name of a device that is the generation destination and a name of a drive that is the generation destination.
(2) fileOpen (Open an Existing File)
Examples of event attribute information of fileOpen are as follows.
    file: a name of the opened file
    pid: a pid of a process requesting the file opening
Other examples of event attribute information of fileOpen include a name of a device in which the opened file exists and a name of a drive in which the opened file exists.
(3) fileClose (Close a File After Read or Write)
Examples of event attribute information of fileClose are as follows.
    file: a name of the closed file
    hash: a hash value of the closed file at its closing
    rByte: a total number of read bytes
    wByte: a total number of written bytes
    pid: a pid of a process requesting the file closing
Other examples of event attribute information of fileClose include a file size of the closed file and a date and time of the initial generation of the closed file.
(4) fileDelete (Delete an Existing File)
Examples of event attribute information of fileDelete are as follows.
    file: a name of the deleted file
    pid: a pid of a process requesting the file deletion
Other examples of event attribute information of fileDelete include a name of a device in which the deleted file had existed and a name of a drive in which the deleted file had existed.
(5) Others
Other examples of event types related to file operations include, for example, fileRename which indicates a change in a file name of an existing file by a process identified by a prsGID, and fileCopy which indicates a copy operation of an existing file by the process. Furthermore, there are similar event types or the like related to folders.

4. Event types related to registry operations
(1) regValSet (Setting of a Prescribed Entry (with Some Kind of Value) to a Designated Subkey)
Examples of event attribute information of regValSet are as follows.
    key: a name of a subkey the entry is set to
    entry: a name of the entry having been set
(2) Others
Other examples of event types related to registry operations include regValReset which indicates deletion of a prescribed entry by a process identified by a prsGID, reg- KeyCreate which indicates generation of a new subkey by the process, regKeyDelete which indicates deletion of a prescribed subkey by the process, and the like.

5. Event types related to user sessions (1) logon (detection of logon by a user)

Examples of event attribute information of logon are as follows.

user: a name of the user who has logged on usrGID: an identifier uniquely allocated to a user session having been started at an arbitrary time and in an arbitrary execution environment Other examples of event attribute information of logon include a logon user domain name and an in-system user session ID that is uniquely assigned to a user session by the system.

Moreover, a logon log record is to be generated in response to receiving a notification from the OS and thus it is not a process behavior log record in a strict sense.

(2) Others

Other examples of event types related to user sessions include logoff indicating detection of logoff of a user, lock indicating detection of a user session entering a locked state, unlock indicating detection of a locked state of a user session being released, and the like. Furthermore, there are similar event types or the like related to remote logon.

6. Other Event Types

Other event types include those related to behavior of the log information generation unit, those related to OS maintenance, those related to connected devices (peripheral apparatuses), and the like.

Figure 5:
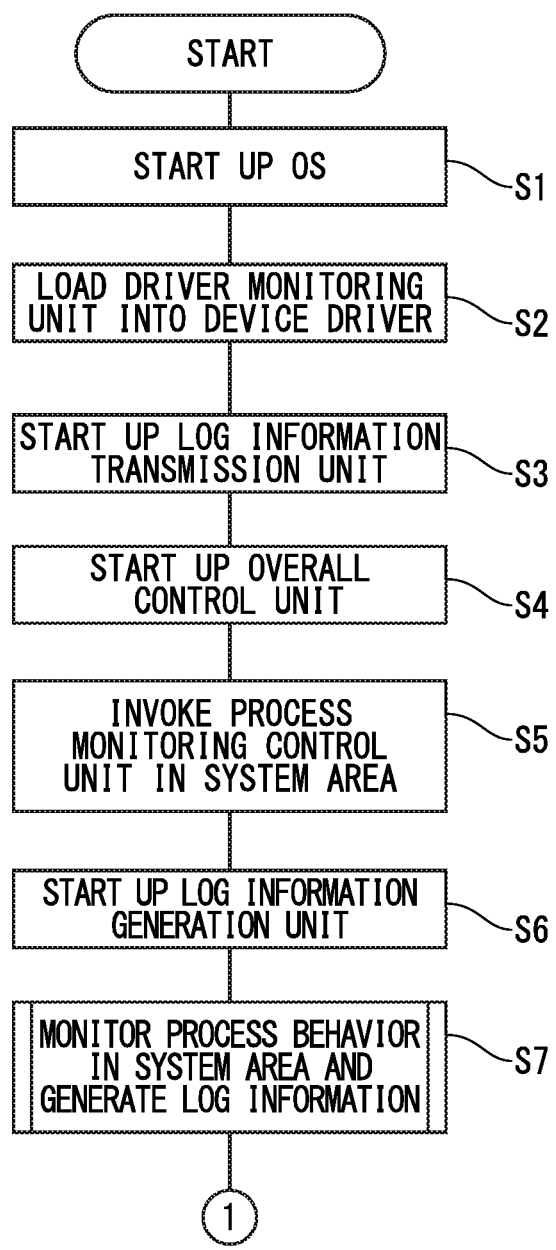
FIG. 5 is a flow chart showing a behavior routine of a client terminal.
Figure 6:
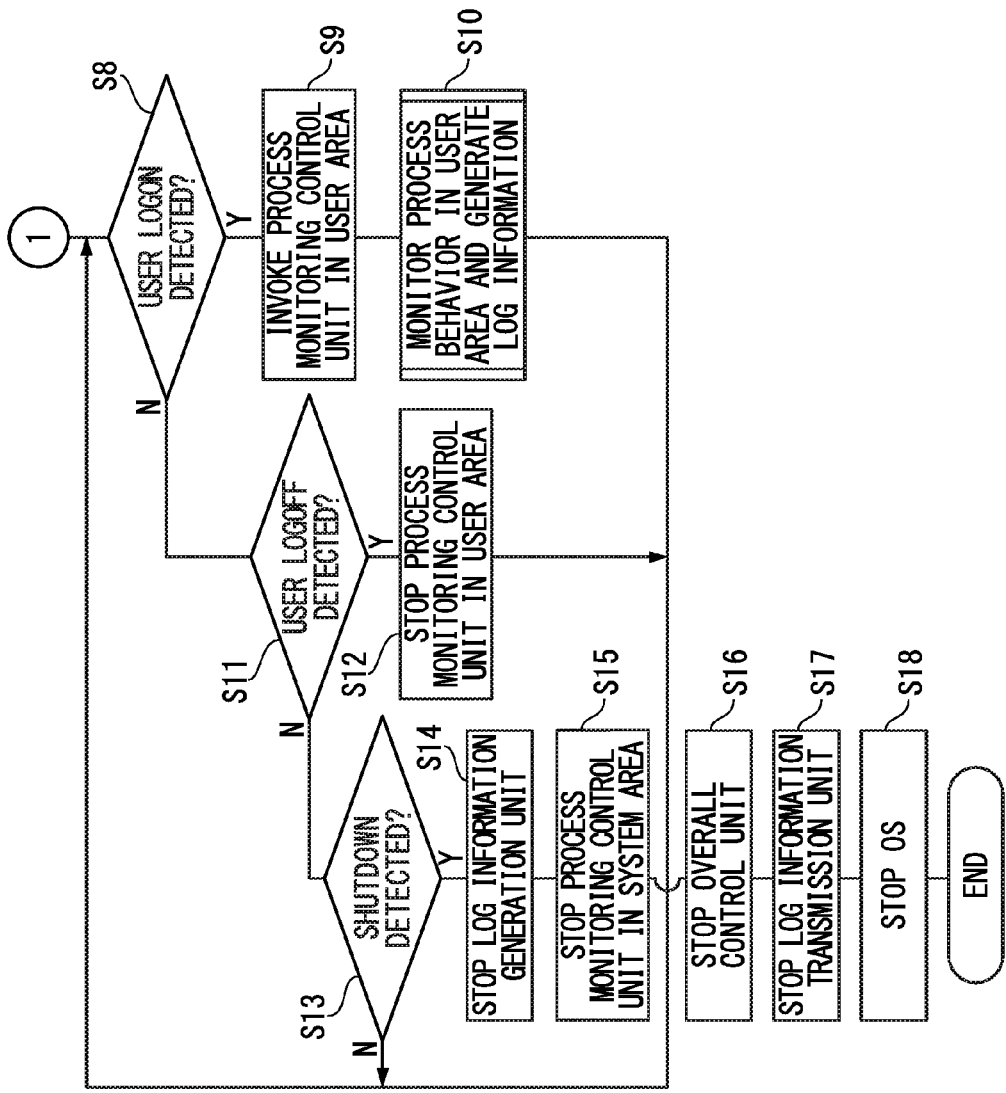
FIG. 6 is a flow chart showing a behavior routine of a client terminal.

FIG. 5 and FIG. 6 are flow charts showing a behavior routine of the client terminal 10. In step S1, the OS of the client terminal 10 starts up. In step S2, the device driver is caused to load the driver monitoring unit 12 shown in FIG. 2.

In step S3, the log information transmission unit 15 starts up. After startup, the log information transmission unit 15 behaves independently of other parts. Specifically, the log information transmission unit 15 transmits log information to the spool apparatus 20 either periodically or when a data size of the log information reaches a prescribed value.

In step S4, the overall control unit 16 shown in FIG. 2 starts up. In step S5, the overall control unit 16 shown in FIG. 2 invokes the process monitoring control unit 13 in the system area. In step S6, the log information generation unit 14 starts up.

In step S7, behavior of a process in the system area is monitored and a process behavior log is generated. Details of step S7 will be provided later.

In step S8 shown in FIG. 6, the overall control unit 16 determines whether a logon by a given user has been detected. When a logon has been detected, the overall control unit 16 notifies the log information generation unit 14 of the logon detection and the flow advances to step S9, but when a logon has not been detected, the flow advances to step S11.

In step S9, the overall control unit 16 invokes the process monitoring control unit 13 in the user area of the user of which a logon has been detected. In step S10, behavior of a process in the user area of the user of which a logon has been detected is monitored and a process behavior log is generated. Details of step S10 will be provided later. Subsequently, the flow returns to step S8.

Meanwhile, in step S11, the overall control unit 16 determines whether a logoff by a given user has been detected. When a logoff has been detected, the overall control unit 16 notifies the log information generation unit 14 of the logoff detection and the flow advances to step S12, but when a logoff has not been detected, the flow advances to step S13.

In step S12, the overall control unit 16 stops the process monitoring control unit 13 in the user area of the user of which a logoff has been detected. Subsequently, the flow returns to step S8.

In step S13, the overall control unit 16 determines whether a shutdown of the system has been detected. When a shutdown has been detected, the flow advances to step S14, but when a shutdown has not been detected, the flow returns to step S8.

In step S14, the log information generation unit 14 stops. In step S15, the overall control unit 16 stops the process monitoring control unit 13 in the system area. In step S16, the overall control unit 16 stops. In step S17, the log information transmission unit 15 stops. In step S18, the OS stops. Subsequently, the present routine ends.

Figure 7:
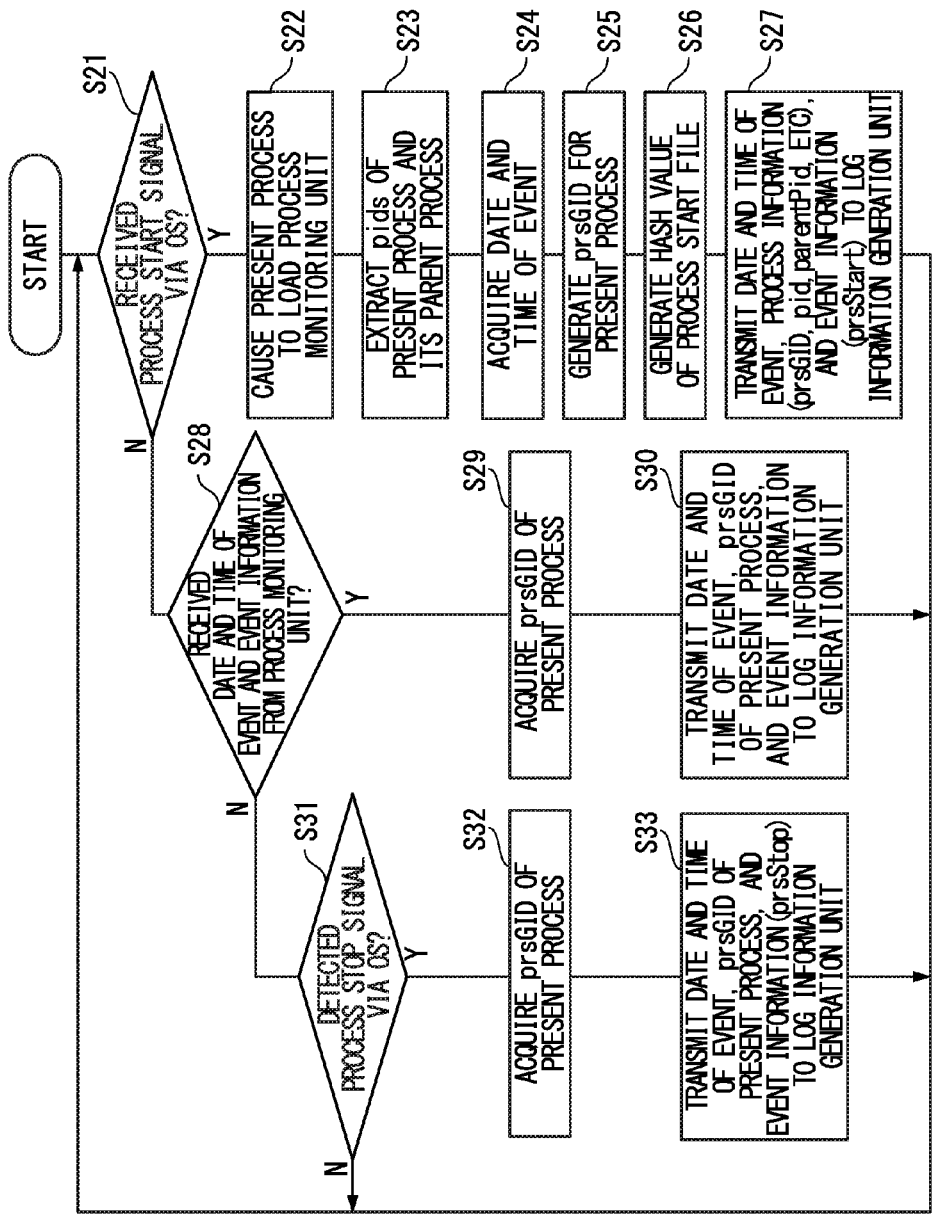
FIG. 7 is a flow chart showing a behavior routine of a process monitoring control unit in step S7 and step S10.

FIG. 7 is a flow chart showing a behavior routine of the process monitoring control unit 13 in step S7 and step S10.

In step S21, the process monitoring control unit 13 determines whether a process start signal indicating that a given process (hereinafter, referred to as a "present process") has started up is received from the OS. When the process monitoring control unit 13 determines that a process start signal has been received, the flow advances to step S22, but when the process monitoring control unit 13 determines that a process start signal has not been received, the flow advances to step S28.

In step S22, the process monitoring control unit 13 causes the present process to load the process monitoring unit 11. Accordingly, the process monitoring unit 11 monitors the present process and outputs event information and the like in accordance with a state of behavior of the present process to the process monitoring control unit 13.

In step S23, the process monitoring control unit 13 extracts a pid (a process ID) which uniquely identifies the present process in the system and a parentPid (a parent process ID) which uniquely identifies a parent process having invoked the present process from the process start signal. In step S24, the process monitoring control unit 13 acquires a "date and time of event" which indicates a date and time of start of the present process.

In step S25, the process monitoring control unit 13 generates a prsGID (a process GID) for globally uniquely identifying the present process. In step S26, the process monitoring control unit 13 generates a hash value of a process execution file of the present process.

Moreover, while one hash value is generated in step S26 in the present embodiment, alternatively, a plurality of hash values with different generation algorithms may be generated so that malware collation with threat intelligence (to be described later) can be performed using a plurality of different threat intelligence. In other words, for example, a plurality of hash values may be generated based on different hash value generation algorithms such as MD5, SHA1, and SHA256.

In step S27, the process monitoring control unit 13 transmits a date and time of event, process information (including a prsGID, a pid, and a parentPid), and event information including the event type prsStart to the log information generation unit 14. Subsequently, the flow returns to step S21.

In step S28, the process monitoring control unit 13 determines whether a date and time of event and event information have been received from the process monitoring unit 11 of a given process (hereinafter, referred to as a "present process"). When reception is determined, the flow advances to step S29, but when non-reception is determined, the flow advances to step S31.

In step S29, the process monitoring control unit 13 acquires a prsGID for the present process which has been generated by the process monitoring control unit 13 upon startup of the present process. In step S30, the process monitoring control unit 13 transmits a date and time of event, a prsGID for the present process, and event information to the log information generation unit 14. Subsequently, the flow returns to step S21.

In step S31, the process monitoring control unit 13 determines whether a process stop signal indicating that a given process (hereinafter, referred to as a "present process") has stopped is received from the OS. When the process monitoring control unit 13 determines that a process stop signal is received, the flow advances to step S32, but when the process monitoring control unit 13 determines that a process stop signal is not received, the flow returns to step S21.

In step S32, the process monitoring control unit 13 acquires a prsGID for the present process which has been generated by the process monitoring control unit 13 upon startup of the present process. In step S33, the process monitoring control unit 13 transmits a date and time of event, a prsGID for the present process, and event information including the event type prsStop to the log information generation unit 14. Subsequently, the flow returns to step S21.

FIG. 8 is a flow chart showing a behavior routine of the log information generation unit 14 related to generation of a process behavior log in step S7 and step S10.

In step S41, the log information generation unit 14 receives a date and time of event and event information from the driver monitoring unit 12 or the process monitoring control unit 13. In addition, process information is also received from the process monitoring control unit 13. In other words, the log information generation unit 14 receives a date and time of event, process information, and event information having been subjected to processing of steps S21 to S33 shown in FIG. 7 from the process monitoring control unit 13. Furthermore, the log information generation unit 14 receives a date and time of event and event information from the driver monitoring unit 12.

In step S42, the log information generation unit 14 determines whether an event type included in the event information received in step S41 is prsStart. When the log information generation unit 14 determines that the event type is prsStart, the flow advances to step S43, but when the log information generation unit 14 determines that the event type is not prsStart, the flow advances to step S46.

In step S43, the log information generation unit 14 extracts a parentPid of a parent process having invoked the present process from process attribute information in the process information received in step S41 and the flow advances to step S44.

In step S44, the log information generation unit 14 refers to a correspondence table of the parent process to retrieve a prsGID for the parent process corresponding to the parentPid extracted in step S44, and sets the retrieved prsGID as the parentGID in the process attribute information in the process information, and the flow advances to step S45.

In this case, the parent process has started up before the present process and has not ended at the time of processing of step S44 which accompanies the start of the present process. Therefore, a correspondence table of the parent process which represents a correspondence relationship between the parentPid and the prsGID for the parent process surely exists.

In step S45, the log information generation unit 14 temporarily saves a correspondence relationship between the prsGID included in the process information and the pid included in the process attribute information in the process information to the correspondence table, and the flow advances to step S46.

In step S46, the log information generation unit 14 determines whether process information has been received in step S41. When the log information generation unit 14 determines that process information has been received, the flow advances to step S49, but when the log information generation unit 14 determines that process information has not been received, the flow advances to step S47. In other words, when the log information generation unit 14 receives event information and the like from the driver monitoring unit 12 in step S41, the flow advances to step S47.

Event attribute information in the event information transmitted from the driver monitoring unit 12 includes a pid of a process having requested a device driver to perform processing. Therefore, in step S47, the log information generation unit 14 extracts a pid from event attribute information in the event information received in step S41, and the flow advances to step S48.

In step S48, the log information generation unit 14 refers to a correspondence table of this process to retrieve a prsGID corresponding to the pid extracted in step S47 and sets the retrieved prsGID to the process information of this event, and the flow advances to step S49. In other words, when this process has requested the device driver to perform processing, the correspondence table of this process is used to obtain a prsGID, which globally uniquely identifies this process, from the pid of this process which is an execution subject of the event information and which has requested the device driver to perform the processing.

In step S49, the log information generation unit 14 acquires endpoint information from the OS, and the flow advances to step S50. In step S50, the log information generation unit 14 generates a sequence number of a process behavior log record to be generated, and the flow advances to step S51

In step S51, the log information generation unit 14 shapes a process behavior log record based on a prescribed log format using the various types of information received in step S41, the endpoint information acquired in step S49, the sequence number generated in step S50, and the information set in step S44 and step S48, and appends the process behavior log record to an existing process behavior log (file), and the flow advances to step S52.

In this case, to enable falsification of a process behavior log record to be detected, the log information generation unit 14 can also generate hash values of one or a plurality of process behavior log records upon generation of the one or the plurality of shaped process behavior log records. A generated hash value is associated with, for example, a sequence number, a date and time of generation, endpoint information, and the like and saved at a secure location. Alternatively, in place of the log information generation unit 14, the spool apparatus 20 can generate hash values of one or a plurality of shaped process behavior log records upon receiving log information.

After startup in step S3, the log information transmission unit 15 behaves independently of other parts. Specifically, the log information transmission unit 15 transmits log information to the spool apparatus 20 either periodically or when a data size of the log information reaches a prescribed value.

In step S52, the log information generation unit 14 determines whether an event type included in the event information received in step S41 is prsStop. When the log information generation unit 14 determines that the event type is prsStop, the flow advances to step S53, but when the log information generation unit 14 determines that the event type is not prsStop, the flow returns to step S41.

In step S53, in consideration of the processing of step S44, after confirming generation of process behavior log records indicating a start of all child processes invoked by the present process, the log information generation unit 14 deletes the correspondence relationship between the prsGID and the pid temporarily saved in step S45 from the correspondence table, and the flow returns to step S41.

In addition to generating a process behavior log as described heretofore, the log information generation unit 14 also generates an operation log attributable to an operation that is independent of a process. Specifically, when the log information generation unit 14 receives a date and time of event and event information constituting an operation log from the overall control unit 16 instead of the driver monitoring unit 12 or the process monitoring control unit 13 in step S41, the log information generation unit 14 performs processing of step S49 and thereafter.

As described above, due to execution of the routine shown in FIG. 5 to FIG. 8, the client terminal 10 generates log information constituted by a process behavior log, an operation log, and the like, and transmits the log information to the spool apparatus 20.

Figure 10:
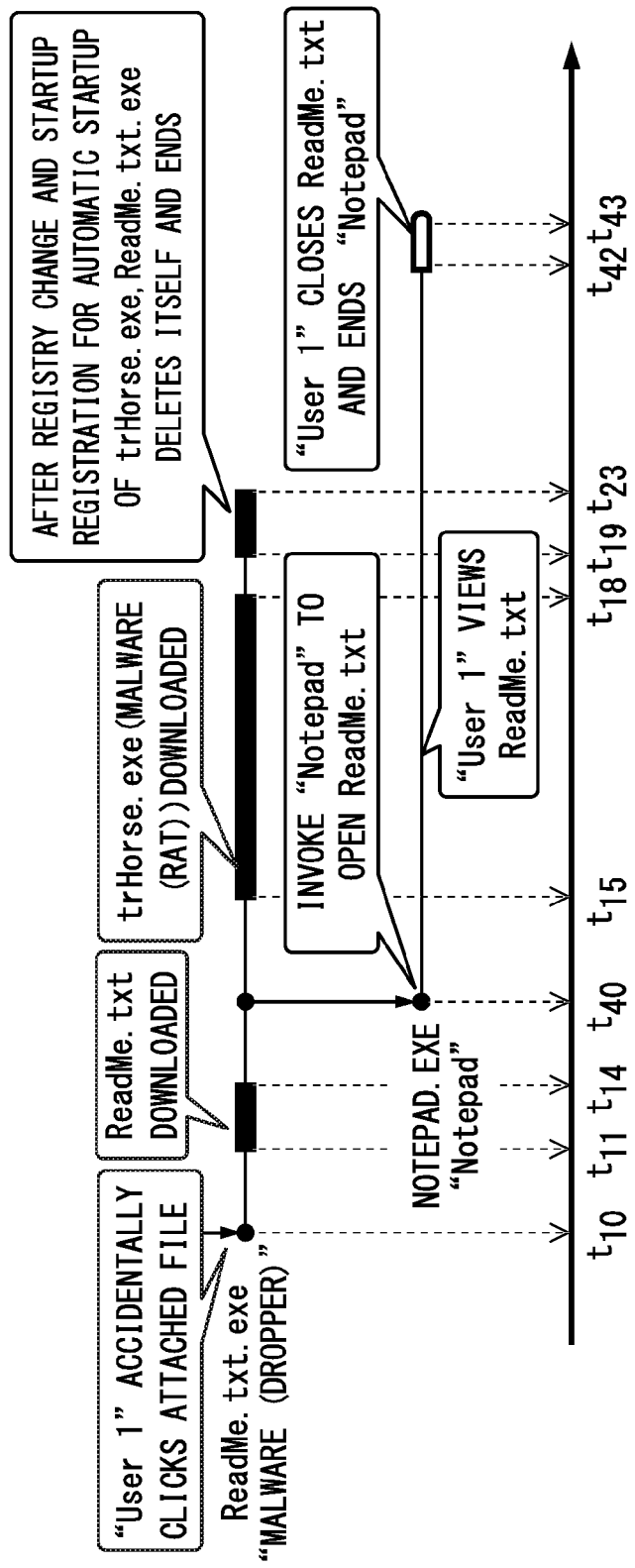
FIG. 10 is a time chart representing an execution state of malware (a dropper).

FIG. 9 is a diagram showing a process behavior log representing an execution state of malware (a dropper). FIG. 10 is a time chart representing an execution state of malware (a dropper). A dropper refers to a program among malware which has a particular function of creating and executing another malware such as RAT malware and causing a user's system to be infected by the malware. In addition, a RAT (Remote Access Trojan) refers to a program capable of carrying out a cyber-attack by being connected from an external computer via a network and performing an arbitrary operation. Contents of the process behavior log shown in FIG. 9 are as follows.

Time t10: User 1 accidentally clicks an attached file of, for example, a spam mail and starts up ReadMe.txt.exe that is malware (a dropper).

Time t11: ReadMe.txt.exe starts downloading ReadMe.txt from a C&C (Command & Control) server (a server computer which is responsible for providing information from the outside and issuing commands to malware having intruded into a client terminal in a cyber-attack) for purposes of camouflage.

Time t14: ReadMe.txt.exe ends download of ReadMe.txt.

Time t40: ReadMe.txt.exe designates downloaded ReadMe.txt and invokes NOTEPAD.EXE ("Notepad") which is an application program for displaying contents of ReadMe.txt for purposes of camouflage.

Time t41: NOTEPAD.EXE opens ReadMe.txt. Accordingly, User 1 views ReadMe.txt with NOTEPAD.EXE.

Time t15: ReadMe.txt.exe starts downloading trHorse.exe which is a type of malware (a RAT) from the C&C server.

Time t18: ReadMe.txt.exe ends downloading of trHorse.exe.

Time t19: ReadMe.txt.exe registers trHorse.exe to Run subkey of the registry so that trHorse.exe automatically starts up at system startup.

t20: ReadMe.txt.exe starts generating a link file to trHorse.exe in a Startup folder of User 1 so that trHorse.exe automatically starts up each time User 1 logs on.

Time t21: ReadMe.txt.exe ends generation of the link file.

Time t22: ReadMe.txt.exe deletes the ReadMe.txt.exe file which is its own process execution file which had resided in a Temp folder.

Time t23: ReadMe.txt.exe ends.

Time t42: User 1 finishes viewing and closes ReadMe.txt.

Time t43: User 1 ends NOTEPAD.EXE.

Figure 12:
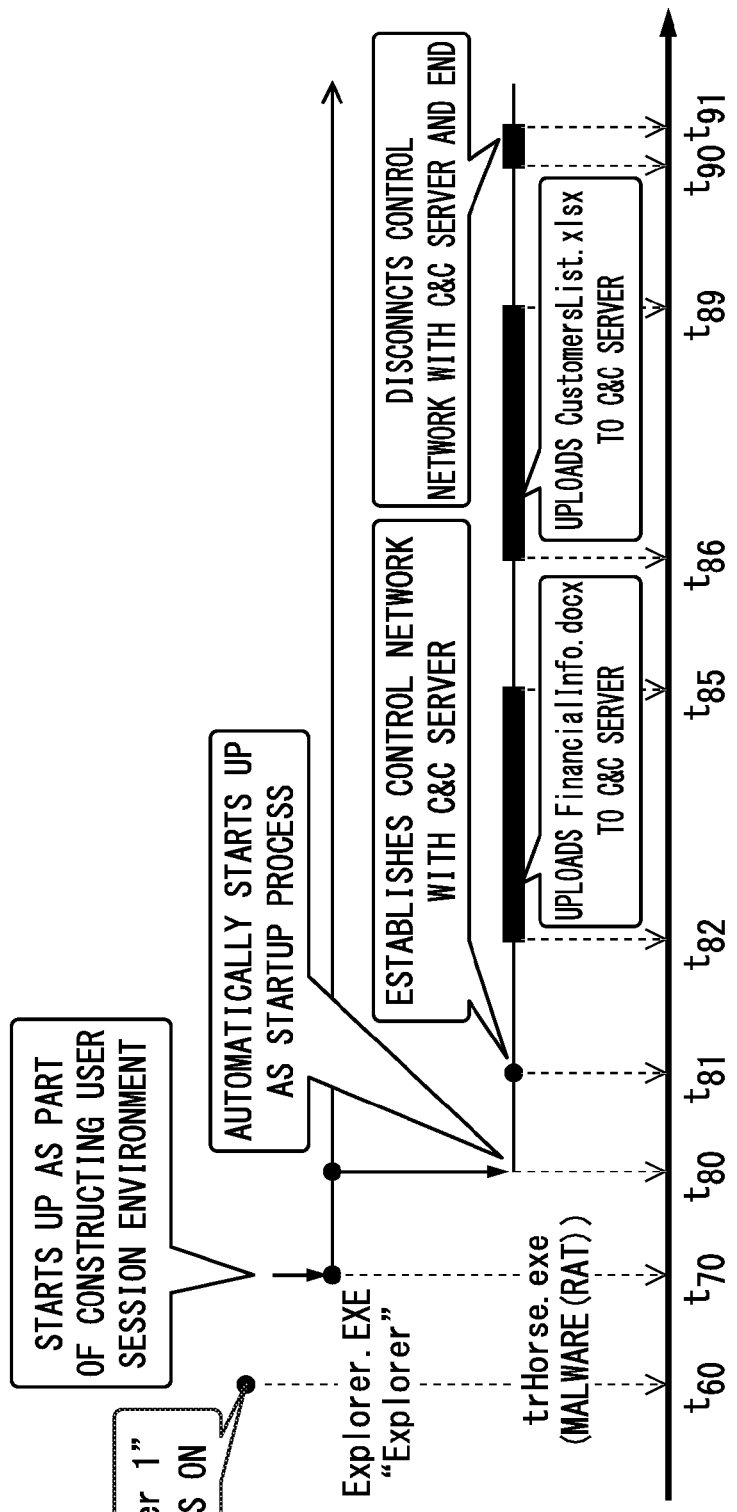
FIG. 12 is a time chart representing an execution state of malware (a RAT).

FIG. 11 is a diagram showing a process behavior log representing an execution state of malware (a RAT). FIG. 12 is a time chart representing an execution state of malware (a RAT). Contents of the process behavior log shown in FIG. 11 are as follows.

Time t60: User 1 logs on to a client terminal infected by trHorse.exe.

Time t70: Explorer.EXE ("Explorer"), which is a task manager, starts up as a part of construction of an execution environment of a user session.

Time t80: Explorer.EXE invokes trHorse.exe as an automatically-started process (startup process) at the start of a user session.

Time t81: trHorse.exe starts controlling network connection to a C&C server which differs from the C&C server described earlier.

Time t82: trHorse.exe starts uploading "FinancialInfo.docx," which is a confidential information file stored in a Documents folder, to a C&C server which further differs from the two C&C servers described earlier.

Time t85: trHorse.exe ends uploading of "FinancialInfo.docx."

Time t86: trHorse.exe starts uploading "CustomersList.xlsx," which is also a confidential information file stored in the Documents folder, to the same C&C server as described above.

Time t89: trHorse.exe ends uploading of "CustomersList.xlsx."

Time t90: trHorse.exe ends the controlling of network connection.

Time t91: trHorse.exe ends.

Figure 13:
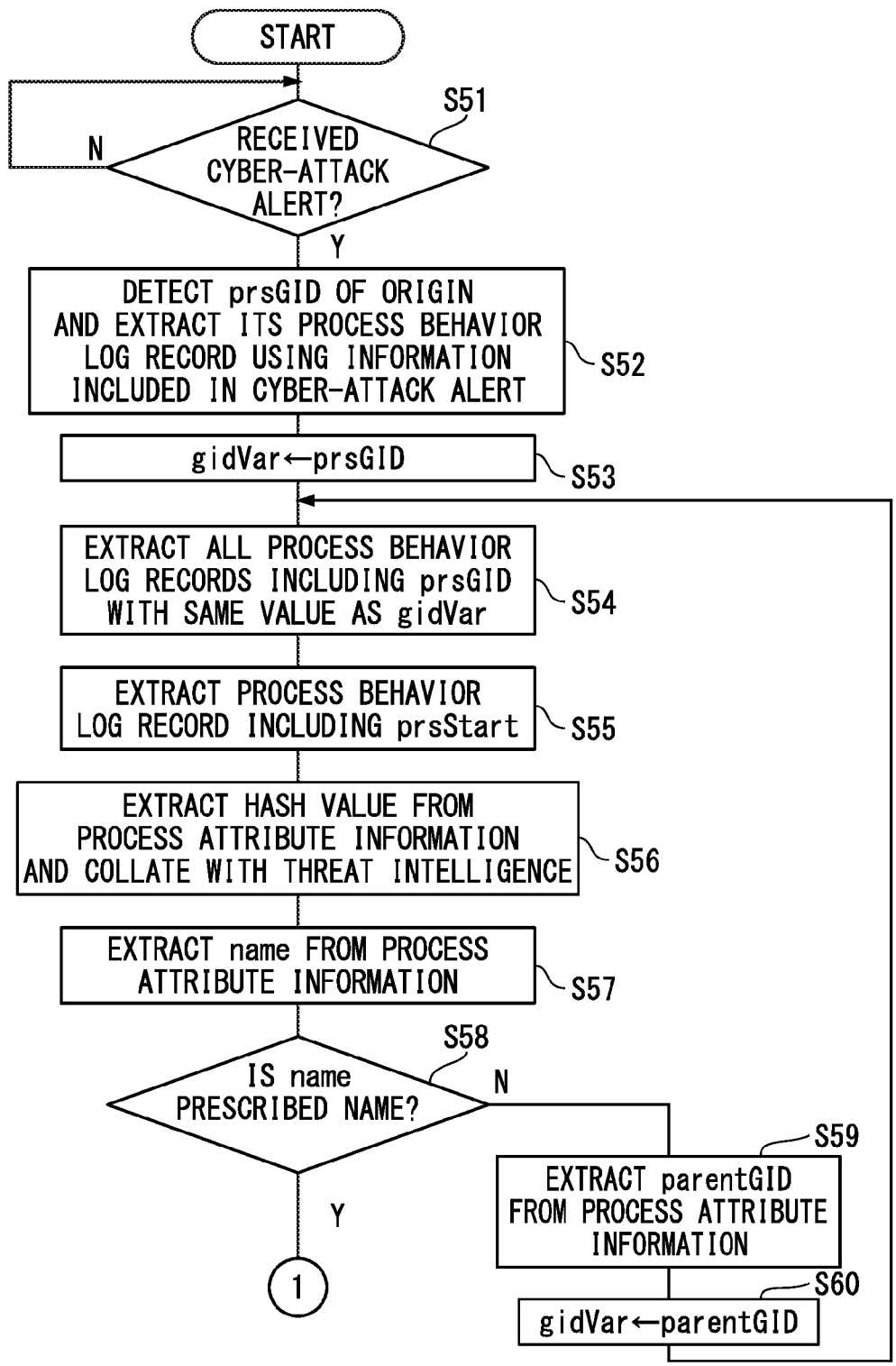
FIG. 13 is a flow chart showing processing by a log information analysis unit.
Figure 14:
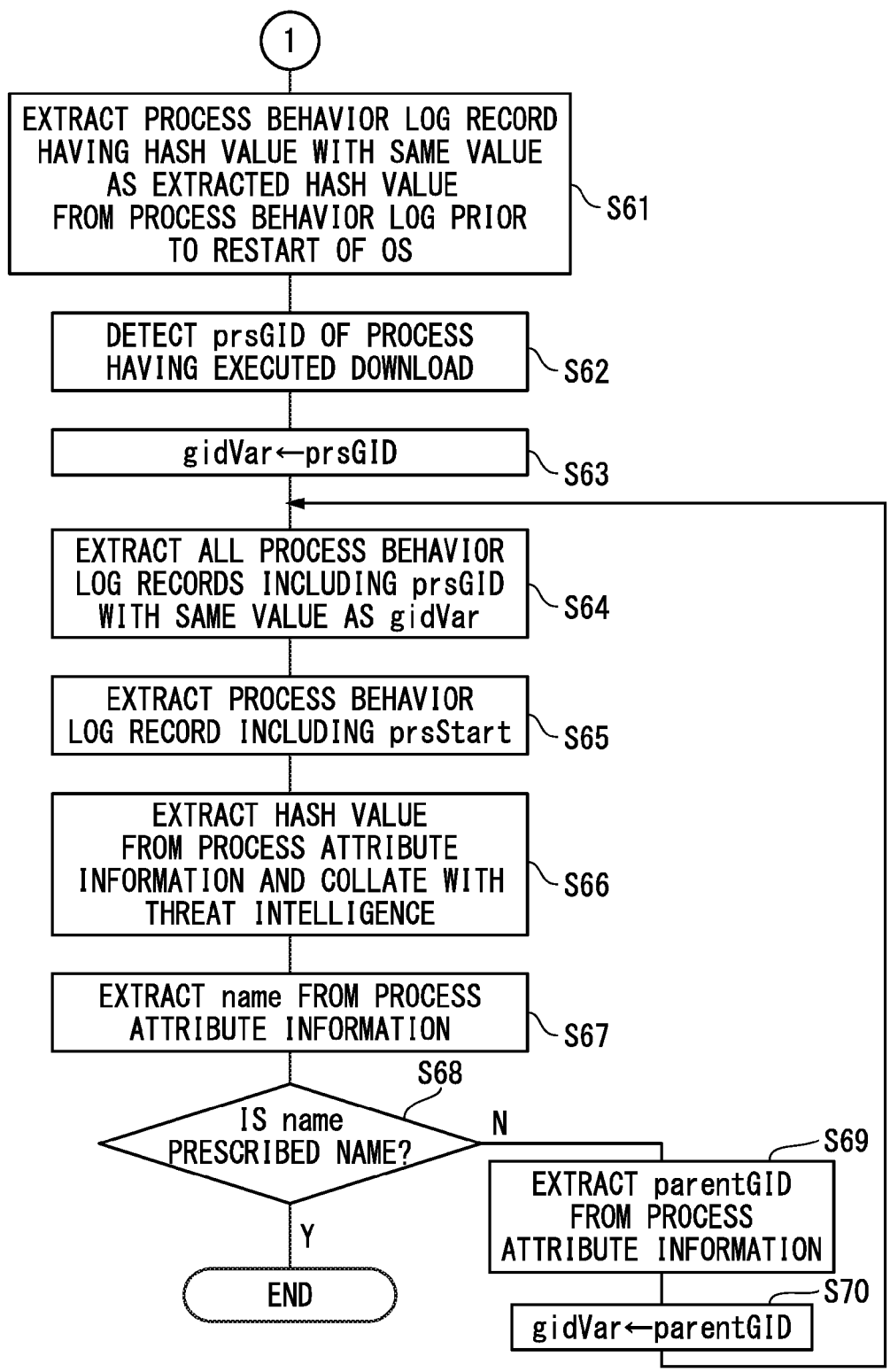
FIG. 14 is a flow chart showing processing by a log information analysis unit.

FIG. 13 and FIG. 14 are flow charts showing processing for the purpose of detecting malware by the log information analysis unit 34, wherein the log information analysis unit 34 performs extraction of a process behavior log record that needs to be directly analyzed from the enormous amount of log information accumulated in the database 32 and performs collation with threat intelligence for determining whether or not a process detected by the analysis is a known malware.

In step S51, the log information analysis unit 34 determines whether a cyber-attack alert signal has been received via a cyber-attack alert signal reception unit (not shown) and awaits reception of a cyber-attack alert signal. When the log information analysis unit 34 determines that a cyber-attack alert signal has been received, the flow advances to step S52.

In this case, a cyber-attack alert signal refers to a signal to be sent when, for example, an external monitoring unit (not shown), which monitors behavior of the malware detection system 1, determines that it is highly probable that the malware detection system 1 has been subjected to a cyber-attack. A cyber-attack alert signal includes information such as a date and time of an incident which is a date and time of the occurrence of the cyber-attack, a host IP address of a terminal having been subjected to the cyber-attack, an IP address (dstIP) of a communication destination of the terminal, and the like.

In step S52, using a process behavior log stored in the database 32 and information included in the cyber-attack alert signal, the log information analysis unit 34 detects a prsGID for a process which has a high probability of being an incident occurrence source and which has been running on the client terminal 10 subjected to the cyber-attack, and extracts an arbitrary process behavior log record of the process.

For example, when the date and time of occurrence of the incident included in the cyber-attack alert signal is t81 and the dstIP is "55 . . . 201," a prsGID="gid4" is detected in a process behavior log record with a sequence number 622 shown in FIG. 11 and the process behavior log record is extracted.

In step S53, the log information analysis unit 34 sets the prsGID detected in step S52 as a variable gidVar. In step S54, the log information analysis unit 34 extracts all process behavior log records including a prsGID with a same value as the variable gidVar. For example, in a case where variable gidVar←"gid4," all process behavior log records with sequence numbers 621 to 632 which share prsGID="gid4" are extracted.

In step S55, the log information analysis unit 34 extracts a process behavior log record in which an event type is prsStart from the extracted process behavior log records. For example, in a case where prsGID="gid4," the process behavior log record with the sequence number 621 which includes prsStart is extracted.

In step S56, the log information analysis unit 34 extracts a hash value of a process execution file of the process from the process attribute information of the process behavior log record extracted in step S55, and collates the hash value with threat intelligence.

Threat intelligence refers to a database apparatus which stores threat information such as names, types, dates of discovery, threat levels, and hash values of execution files of previously-discovered malware. When a collation request with respect to a hash value is made by the client terminal 10 and the threat intelligence stores malware having the hash value, the threat intelligence transmits threat information on the malware to the client terminal 10.

For example, with respect to the sequence number 621, a hash value "hsh11" of a process "trHorse.exe" which is malware (a RAT) is extracted. When a collation request with respect to the hash value "hsh11" is made by the client terminal 10 and the threat intelligence stores threat information on the malware (a RAT) "trHorse.exe," the threat intelligence transmits the threat information to the client terminal 10.

Moreover, with different threat intelligence, a hash value of a process execution file based on a different generation algorithm is required. Therefore, when a plurality of hash values with different generation algorithms are included in process attribute information, a hash value generated based on an algorithm required by target threat intelligence may be selected and collated.

In step S57, the log information analysis unit 34 extracts name that is a name of the process execution file of the process from the process attribute information of the process behavior log record extracted in step S55.

In step S58, the log information analysis unit 34 determines whether or not the name of the process execution file extracted in step S57 matches a prescribed name and, when the name matches, the flow advances to step S61 shown in FIG. 14. On the other hand, when a negative determination is made in step S58 or, in other words, when the name of the process execution file does not match the prescribed name, the flow advances to step S59.

In this case, for example, a name of a root process positioned at the highest level of a process invocation tree representing parent-child relationships of process invocations or the like is designated as the prescribed name. In the present embodiment, the prescribed name is "Explorer.EXE."

In step S59, in order to study a process behavior log of a parent process having invoked the process as a child, the log information analysis unit 34 extracts a parentGID from the process attribute information of the process behavior log record extracted in step S55. For example, a parentGID="gid3" is extracted from the process attribute information with the sequence number 621.

In step S60, the log information analysis unit 34 sets the parentGID extracted in step S59 as the variable gidVar and the flow returns to step S54. Subsequently, processing of step S54 and thereafter is executed once again.

For example, when the parentGID="gid3" is set as the variable gidVar in step S60, "Explorer.EXE" is extracted as name of the process in step S57 through the processing of step S54 and thereafter. Therefore, since this name is determined as the prescribed name in step S58, the flow exits the present loop and advances to step S61 shown in FIG. 14.

Moreover, in FIG. 13, while a case where a cyber-attack alert signal is sent from an external monitoring unit in step S51 is assumed, the present invention is not limited to such an assumption. For example, the log information analysis unit 34 can execute an analysis upon each reception of a process behavior log by the log information reception unit 31, collate with previous incident occurrence patterns and, when a result of the collation matches prescribed conditions, send a cyber-attack alert signal by itself.

In step S61 shown in FIG. 14, in order to identify a process behavior log of a process suspected to be malware related to "trHorse.exe" from process behavior logs prior to restart of the OS or prior to user logon, the log information analysis unit 34 extracts a process behavior log record which includes a hash value with the same value as the hash value of the process execution file extracted in step S56.

For example, the process attribute information with the sequence number 621 includes the parentGID="gid3." Therefore, studying a process behavior log record (sequence number 520) which includes an event type of prsStart in the process behavior log sharing prsGID="gid3" reveals that, since a process expressed as name=" . . . \Explore.EXE" started up at time t70, the user has logged on and a new user session has been established.

In consideration thereof, the log information analysis unit 34 extracts a process behavior log record with the sequence number 110, which includes a hash value with the same value as the hash value "hsh11" already extracted in step S56 in its event attribute information, from a process behavior log prior to user logon or, in other words, prior to time t60.

In step S62, the log information analysis unit 34 detects a prsGID for a process having executed a download of a file of which a hash value is "hsh11," For example, when the process behavior log record with the sequence number 110 is extracted in step S61, a date and time of event t17, a prsGID="gid1," and event attribute information (for example, "trHorse.exe" which is a file name of the downloaded file) are detected from the record.

In step S63, the log information analysis unit 34 sets the prsGID specified in step S62 as a variable gidVar. In step S64, the log information analysis unit 34 extracts all process behavior log records including a prsGID with the same value as the variable gidVar. For example, in a case where variable gidVar←"gid1," all process behavior log records with sequence numbers 101 to 116 (with the exception of sequence numbers 106 and 107) which share prsGID="gid1" are extracted.

In step S65, the log information analysis unit 34 extracts a process behavior log record in which an event type is prsStart from the process behavior log records extracted in step S64. For example, in a case where prsGID="gid1," the process behavior log record with the sequence number 101 which includes prsStart is extracted.

In step S66, the log information analysis unit 34 extracts a hash value of a process execution file of the process from the process attribute information of the process behavior log record extracted in step S65, and collates the hash value with threat intelligence.

For example, with respect to the sequence number 101, a hash value "hsh10" of a process "ReadMe.txt.exe" which is malware (a dropper) is extracted. When a collation request with respect to the hash value "hsh10" is made by the client terminal 10 and the threat intelligence stores threat information on the malware (a dropper) "ReadMe.txt.exe," the threat intelligence transmits the threat information to the client terminal 10.

In step S67, the log information analysis unit 34 extracts name that is a name of the process execution file of the process from the process attribute information of the process behavior log record extracted in step S65.

In step S68, the log information analysis unit 34 determines whether or not the name of the process execution file extracted in step S67 matches a prescribed name and, when the name matches, the present routine ends. On the other hand, when a negative determination is made in step S68 or, in other words, when the name of the process execution file does not match the prescribed name, the flow advances to step S69.

For example, in the process attribute information with the sequence number 101, name is not "Explorer.EXE." Therefore, after the negative determination in step S68, the flow advances to step S69.

In step S69, in order to study a process behavior log of the parent process having invoked the process, the log information analysis unit 34 extracts a parentGID from the process attribute information of the process behavior log record extracted in step S65.

In step S70, the log information analysis unit 34 sets the parentGID extracted in step S69 as the variable gidVar and the flow returns to step S64. Subsequently, processing of step S64 and thereafter is executed once again. As a result, when "Explorer.EXE" is extracted as name in step S67, since "Explorer.EXE" is determined as the prescribed name in step S68, the flow exits the present loop and the present routine ends.

Moreover, in the present processing, the log information analysis unit 34 regards each process as a task and, using a prsGID which globally uniquely identifies the task as a key, extracts process behavior log records which record a series of behaviors constituting the task. In addition, the log information analysis unit 34 selects a process behavior log record including prsStart that is an event type as behavior type information indicating a start of a process among the extracted process behavior log records, and identifies the task by considering process attribute information included in the selected process behavior log record as task attribute information. Furthermore, using a parentGID or the like which is included in the extracted process behavior log record and which globally uniquely identifies a different task as a key, the log information analysis unit 34 extracts a process behavior log record which records a series of behaviors constituting the different task. However, the present invention is not limited to such processing.

Specifically, for example, the log information analysis unit 34 can regard each TCP network communication as a task and, using a tcpGID which globally uniquely identifies the task as a key, extract process behavior log records which record an event type such as tcpOpen, tcpListen, tcpSend, tcpReceive, and tcpClose as behavior type information indicating a series of behaviors constituting the task. In addition, the log information analysis unit 34 can select a process behavior log record including tcpOpen that is an event type indicating a start of TCP network communication among the extracted process behavior log records, and identify the task by considering event attribute information pieces other than tcpGID in the event attribute information included in the selected process behavior log record as task attribute information. Furthermore, using a prsGID or the like which is included in the extracted process behavior log record and which globally uniquely identifies a different task as a key, the log information analysis unit 34 may extract a process behavior log record which records a series of behaviors constituting the different task.

Moreover, similar processing may be performed on an operation log that is independent of a process by using, for example, a usrGID which globally uniquely identifies an arbitrary user session as a key.

Figure 15:
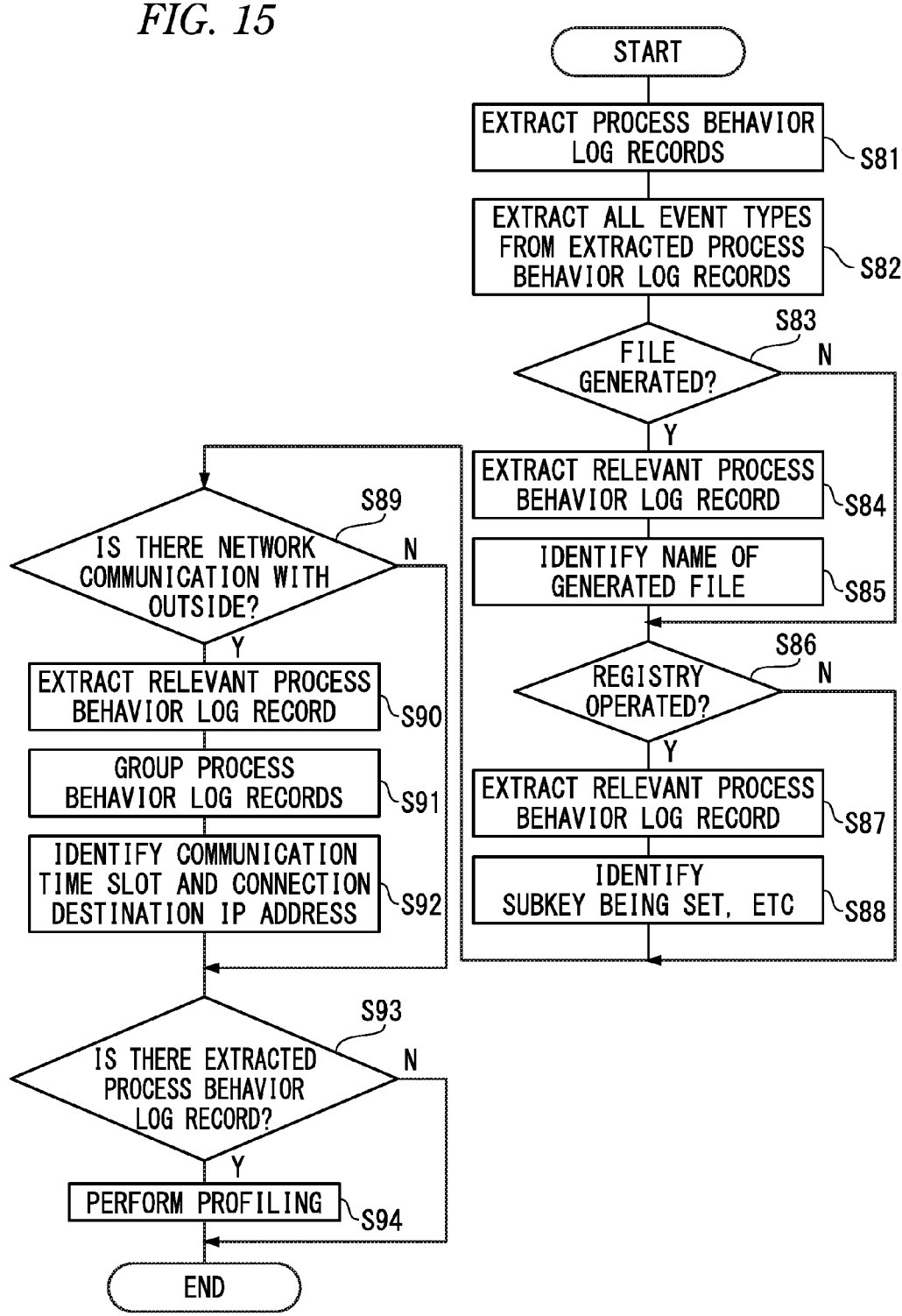
FIG. 15 is a flow chart showing processing by a log information analysis unit.

FIG. 15 is a flow chart showing processing of the log information analysis unit 34 for performing profiling of malware from an extracted process behavior log record as an example of log information analysis.

In step S81, the log information analysis unit 34 extracts process behavior log records that need to be directly subjected to the present log information analysis through the processing shown in FIG. 13 and FIG. 14.

In step S82, the log information analysis unit 34 extracts event types from all of the process behavior log records extracted in step S81. In step S83, the log information analysis unit 34 determines whether a file has been created in any of the process behavior log records extracted in step S81.

At this point, when "fileCreate" indicating the creation of a file exists in the event types extracted in step S82, the log information analysis unit 34 determines that a file has been created, and the flow advances to step S84. On the other hand, when "fileCreate" does not exist in the event types, the log information analysis unit 34 determines that a file has not been created, and the flow advances to step S86.

For example, among the sequence numbers 101 to 116 (with the exception of sequence numbers 106 and 107), "fileCreate" exists in the process behavior log records with the sequence numbers 103, 109, and 113. Therefore, the flow advances to step S84.

In step S84, the log information analysis unit 34 extracts process behavior log records indicating that a file has been created. For example, since the process behavior log records including "fileCreate" are those with the sequence numbers 103, 109, and 113, the process behavior log records with the sequence numbers 103, 109, and 113 are extracted.

In step S85, the log information analysis unit 34 identifies a name of the generated file from the extracted process behavior log records.

As a result, it is revealed that a file named ReadMe.txt has been created at a date and time of event t12, a file named trHorse.exe has been created at a date and time of event t16, and a shortcut file of trHorse.exe has been created at a date and time of event t20.

In step S86, the log information analysis unit 34 determines whether an operation on the registry has been performed in any of the process behavior log records extracted in step S81. At this point, when "regValSet" indicating an operation on the registry exists in the event types extracted in step S82, the log information analysis unit 34 determines that an operation on the registry has been performed, and the flow advances to step S87. On the other hand, when "regValSet" does not exist in the event types, the log information analysis unit 34 determines that an operation on the registry has not been performed, and the flow advances to step S89.

For example, among the sequence numbers 101 to 116 (with the exception of sequence numbers 106 and 107), "regValSet" exists in the process behavior log record with the sequence number 112. Therefore, the flow advances to step S87.

In step S87, the log information analysis unit 34 extracts the process behavior log record indicating that an operation on the registry has been performed. For example, since the process behavior log record including "regValSet" is that with the sequence number 112, the process behavior log record with the sequence number 112 is extracted.

In step S88, the log information analysis unit 34 identifies a subkey or the like that has been set in the registry operation from the extracted process behavior log record.

As a result, it is revealed that an entry for automatically starting up trHorse.exe upon startup of the system has been created in a Run subkey of the registry at the date and time of event t19.

In step S89, the log information analysis unit 34 determines whether network communication with the outside has occurred in any of the process behavior log records extracted in step S81. At this point, when "tcpOpen" indicating a start of TCP network connection exists in the event types extracted in step S82, the log information analysis unit 34 determines that network communication with the outside has occurred, and the flow advances to step S90. On the other hand, when "tcpOpen" does not exist in the event types, the log information analysis unit 34 determines that network communication with the outside has not occurred, and the flow advances to step S93.

For example, among the sequence numbers 621 to 632, "tcpOpen" exists in the process behavior log records with the sequence numbers 622, 623, and 627. Therefore, the flow advances to step S90.

In step S90, the log information analysis unit 34 extracts process behavior log records indicating that network communication with the outside has occurred. For example, among the sequence numbers 621 to 632, since the process behavior log records including "tcpOpen" are those with the sequence numbers 622, 623, and 627, the process behavior log records with the sequence numbers 622, 623, and 627 are extracted.

In step S91, the log information analysis unit 34 extracts a value of a tcpGID from event attribute information of the extracted process behavior log records, extracts all other process behavior log records having the same tcpGID value, and groups them.

For example, among the sequence numbers 621 to 632, "gid101," "gid102," and "gid103" are extracted as tcpGID values from the respective pieces of event attribute information of the process behavior log records with the sequence numbers 622, 623, and 627. Accordingly, since process behavior log records with the sequence numbers 631, 626, and 630 are extracted as other process behavior log records having the same tcpGID values as those described above, respectively, each of these process behavior log records are respectively grouped with the process behavior log records with the sequence numbers 622, 623, and 627.

In step S92, the log information analysis unit 34 extracts a date and time of event and a value of dstIP from the grouped process behavior log records, and identifies a communication time slot and a connection destination IP address of each network communication.

As a result, it is revealed that a network communication of which a tcpGID is identified as "gid101" occurred during a time period from a date and time of event t81 to a date and time of event t90 with an IP address "55 . . . 201" as a connection destination, a network communication of which a tcpGID is identified as "gid102" occurred during a time period from a date and time of event t82 to a date and time of event t85 with an IP address "55 . . . 202" as a connection destination, and a network communication of which a tcpGID is identified as "gid103" occurred during a time period from a date and time of event t86 to a date and time of event t89 with the same IP address "55 . . . 202" as described above as a connection destination.

Moreover, the events described in steps S83, S86, and S89 are merely examples. In other words, the log information analysis unit 34 is capable of determining a presence or absence of other events in order to study a series of behaviors of malware.

In step S93, the log information analysis unit 34 determines whether there is a process behavior log record extracted in step S84, step S87, or step S90. When there is an extracted process behavior log record, the flow advances to step S94, but when there is no extracted process behavior log record, the present routine ends.

In step S94, the log information analysis unit 34 performs profiling of malware using, for example, the name of the generated file identified in step S85, the subkey being set in the registry operation identified in step S88, and the communication time slot, the connection destination IP address of the external network communication identified in step S92, and the present routine ends.

In this case, profiling refers to identifying behavior of malware including security breaches, spying, proliferation, and attacks (data breach and malicious destruction) and inferring characteristics of behavior of unknown malware in the course of studying malware with respect to cyberattacks. In the present embodiment, profiling refers, for example, to statistically inferring behavior of malware from the process behavior log records obtained in step S84, step S87, step S90, and the like by using information identified in step S85, step S88, step S92 and the like as a key, and to identifying behavior of malware by organizing necessary information through mutual reference between the obtained process behavior log records and operation logs represented by the logon with the sequence number 419, information on previous malware, or the like.

Moreover, the present embodiment has been described with a focus on the detection of malware as a so-called malicious application program through the collection and analysis of process behavior logs related to behavior of a process as an execution subject of an application program. However, the present invention is not limited to the embodiment described above.

In addition to a process, the present invention can also be applied to an arbitrary task that is constituted by a series of behaviors such as an operation on a terminal by a user and connection of a recording medium. In other words, the present invention enables log information of all tasks to be generated per program (process), per user, or per computer and enables log information necessary for analysis to be efficiently extracted from the generated log information.

For example, a logon by a user, a connection of a recording medium, and a change in a set time of an OS are also recorded as log information. Therefore, a malicious user can be identified or the innocence of a user can be proved. In addition, by focusing on a process behavior log record of a process as an execution subject of a desired application program, usage of the application program can be discerned for each user or for each terminal.

Furthermore, the present invention can also be used for the purposes of assessing the security of a confidential file (a specific file), visualizing work proficiency from computer usage, creating a list of files uploaded to a cloud service, discovering misplaced files due to erroneous operations, checking program behavior (similar to debugging), managing attendance (managing labor), assessing work performance (usage of non-business applications and non-business websites), and performing a file transfer audit.

That which is claimed:

1. A log information generation apparatus, comprising:
    a process information generation unit configured to generate process information including first identification information for temporally and spatially uniquely identifying a process, wherein the process is an execution subject of an application program, wherein the process information generate unit is further configured to generate the process information at a start of a process behavior constituted by a series of events of the process, in a space of a system including a plurality of computers;
    the process information generation unit further configured to acquire second identification information for temporally and spatially uniquely identifying a parent process of the process and to generate the process information including the second identification information;
    an event information generation unit configured to generate event type information indicating an event type for each of the events, and which generates event information including the event type information;
    a log information generation unit configured to generate, for each of the events, log information including the process information generated by the process information generation unit and the event information generated by the event information generation unit;
    and a log information storage unit configured to store the log information.

2. The log information generation apparatus according to claim 1, wherein:
    the process information further includes process attribute information indicating an attribute of the process at a time of the start of the process behavior, wherein the process attribute information includes the second identification information;
    the event information generation unit is further configured to generate event attribute information indicating an attribute of an event for each event after the time of start of the process behavior, and generate the event information including the event type information and the event attribute information; and
    the log information generation unit is further configured to generate log information having the event information and the process information that includes both the first identification information and the process attribute information for an event at the time of start of the process behavior, and generate log information having the event information and the process information that includes only the first identification information for an event at a time other than the start of the process behavior.

3. The log information generation apparatus according to claim 1, further comprising:
    a storage unit configured to store a correspondence relationship between the first identification information of the process and third identification information for uniquely identifying the process in a single computer; and
    an acquisition unit configured to, when the process makes a request for a prescribed event to a desired request destination and only the third identification information of the process is output from the desired request destination, acquire the first identification information corresponding to the third identification information output from the desired request destination based on the correspondence relationship stored in the storage unit, wherein
    the log information generation unit is further configured to generate the log information using process information including the first identification information acquired by the acquisition unit.

4. The log information generation apparatus according to claim 1, wherein
    the log information generation unit is further configured to generate the log information to further include execution environment information indicating a state of a computer for each of the events.

5. The log information generation apparatus according to claim 1, wherein
    the log information generation unit is further configured to generate one or more hash values of a process execution file of a process indicated by the first identification information based on one or more different hash value generation algorithms, and generate the process information further including the generated one or more hash values.

6. The log information generation apparatus according to claim 1, wherein
    the process information generation unit is further configured to generate the process information to further include a name of a process execution file of a process indicated by the first identification information.

7. The log information generation apparatus according to claim 1, wherein
    the log information generation unit is further configured to generate all or a part of hash values of all log information from a start to an end of the process.

8. A non-transitory computer readable medium having recorded therein a program that when executed by a computer configures the computer to function as:
    a process information generation unit which generates process information including first identification information for temporally and spatially uniquely identifying a process, wherein the process is an execution subject of an application program, wherein the process information generate unit is further configured to generate the process information at a start of a process behavior constituted by a series of events of the process, in a space of a system including a plurality of computers;

the process information generation unit acquires second identification information for temporally and spatially uniquely identifying a parent process of the process;

an event information generation unit which generates event type information indicating an event type for each of the events, and which generates event information including the event type information;

a log information generation unit which generates, for each of the events, log information including the process information generated by the process information generation unit and the event information generated by the event information generation unit; and a log information storage unit which stores the log information.

9. A log information extraction apparatus, comprising:

an input unit configured to receive time information and execution environment information in a space of a system including a plurality of computers;

a log information storage unit configured to store log information including time information, execution environment information, and process information, wherein the process information is generated at a start of a process behavior constituted by a series of events of a process that is an execution subject of an application program and the process information further includes first identification information for temporally and spatially uniquely identifying the process and wherein the process information further includes second identification information for temporally and spatially uniquely identifying a parent process of the process;

wherein the log information storage unit is further configured to store event information that includes event type information indicating an event type for each of the events; and a log information extraction unit configured to detect first identification information included in log information corresponding to the time information and the execution environment information received by the input unit among all the log information pieces stored in the log information storage unit, and extract all or a part of log information including the detected first identification information and the second identification information.

10. The log information extraction apparatus according to claim 9, wherein:

the log information extraction unit is further configured to extract all or a part of log information having the detected first identification information, extract the second identification information of the parent process from the extracted log information, and extract all or a part of log information having the extracted second identification information.

11. A non-transitory computer readable medium having recorded therein a program that when executed by a computer configures the computer to function as:

an input unit to receive time information and execution environment information in a space of a system including a plurality of computers;

a log information storage unit which stores log information including time information, execution environment information, and process information, wherein the process information is generated at a start of a process behavior constituted by a series of events of a process that is an execution subject of an application program and the process information further includes first identification information for temporally and spatially uniquely identifying the process and wherein the process information further including second identification information for temporally and spatially uniquely identifying a parent process of the process;

wherein the log information storage unit further stores event information that includes event type information indicating an event type for each of the events; and a log information extraction unit which detects first identification information included in log information corresponding to the time information and the execution environment information received by the input unit among all the log information pieces stored in the log information storage unit, and extracts all or a part of log information including the detected first identification information and the second identification information.

* * * * *